(12) United States Patent
Kim

(10) Patent No.: US 11,550,353 B1
(45) Date of Patent: Jan. 10, 2023

(54) FOLDABLE PEDAL APPARATUS FOR VEHICLE

(71) Applicants: Hyundai Motor Company, Seoul (KR); Kia Corporation, Seoul (KR)

(72) Inventor: Eun Sik Kim, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/738,108

(22) Filed: May 6, 2022

(30) Foreign Application Priority Data

Sep. 6, 2021  (KR) .......................... 10-2021-0118347

(51) Int. Cl.
| | | |
|---|---|---|
| *G05G 1/30* | (2008.04) | |
| *G05G 1/40* | (2008.04) | |
| *B60K 26/02* | (2006.01) | |
| *B60T 7/06* | (2006.01) | |
| *G05G 1/015* | (2008.04) | |
| *B60T 7/04* | (2006.01) | |
| *G05G 5/05* | (2006.01) | |
| *B60R 21/09* | (2006.01) | |
| *G05G 5/00* | (2006.01) | |

(52) U.S. Cl.
CPC ............... *G05G 1/40* (2013.01); *B60K 26/02* (2013.01); *B60R 21/09* (2013.01); *B60T 7/042* (2013.01); *B60T 7/06* (2013.01); *G05G 1/015* (2013.01); *G05G 5/005* (2013.01); *G05G 5/05* (2013.01); *B60K 2026/026* (2013.01); *G05G 2505/00* (2013.01)

(58) Field of Classification Search
CPC ............ G05G 1/015; G05G 1/30; G05G 1/32; G05G 1/36; G05G 1/40; G05G 1/405; G05G 5/005; G05G 5/28; B60K 26/02; B60K 2026/024; B60K 2026/026; B60T 7/04; B60T 7/042; B60T 7/06; B60T 7/065; B60R 21/09

See application file for complete search history.

(56) References Cited

U.S. PATENT DOCUMENTS

| | | | |
|---|---|---|---|
| 10,906,514 B1 * | 2/2021 | Kim | G05G 5/03 |
| 10,946,741 B1 * | 3/2021 | Kim | B60T 7/06 |
| 11,021,058 B1 * | 6/2021 | Kim | G05G 5/28 |
| 11,249,506 B1 * | 2/2022 | Kim | G05G 5/28 |
| 11,312,236 B1 * | 4/2022 | Kim | B60T 7/065 |

(Continued)

FOREIGN PATENT DOCUMENTS

| | | |
|---|---|---|
| DE | 102017215904 A1 * | 3/2019 |
| KR | 10-2017-0137427 A | 12/2017 |
| WO | WO-2021182563 A1 * | 9/2021 |

OTHER PUBLICATIONS

Machine Translation of WO 2021/182563.*
Machine Translation of DE 10 2017 215 904.*

*Primary Examiner* — Brian J McGovern
(74) *Attorney, Agent, or Firm* — an, Lewis & Bockius LLP

(57) ABSTRACT

A foldable pedal apparatus for a vehicle is configured so that in a manual driving mode in which a driver directly drives a vehicle, a pedal pad 400 is in a popped-up state of protruding and being exposed toward the driver to be operable by the driver, and in an autonomous traveling situation of the vehicle, the pedal pad 400 is in a hidden state of being hidden and blocked from being exposed toward the driver to be inoperable by the driver.

17 Claims, 9 Drawing Sheets

(56) References Cited

U.S. PATENT DOCUMENTS

| | | | |
|---|---|---|---|
| 11,458,838 B1* | 10/2022 | Kim | B60T 7/06 |
| 11,465,498 B1* | 10/2022 | Kim | B60K 26/02 |
| 2021/0331584 A1* | 10/2021 | Kim | G05G 1/40 |
| 2022/0001843 A1* | 1/2022 | Michael | G05G 1/60 |
| 2022/0011806 A1* | 1/2022 | Miletto | B60K 23/02 |
| 2022/0048384 A1* | 2/2022 | Kim | G05G 5/28 |

* cited by examiner

FOLDABLE PEDAL APPARATUS FOR VEHICLE

CROSS REFERENCE TO RELATED APPLICATION

The present application claims priority to Korean Patent Application No. 10-2021-0118347 filed on Sep. 6, 2021, the entire contents of which is incorporated herein for all purposes by this reference.

BACKGROUND OF THE PRESENT DISCLOSURE

Field of the Present Disclosure

The present disclosure relates to a foldable pedal apparatus for a vehicle, and more specifically, to a technology relating to a foldable pedal apparatus for a vehicle in which in a manual driving mode in which a driver directly drives a vehicle, a pedal pad protrudes and is exposed toward the driver to be operable by the driver, and in an autonomous traveling situation of the vehicle, the pedal pad is hidden and blocked from being exposed toward the driver to be inoperable by the driver.

Description of Related Art

An autonomous vehicle is a smart vehicle combined with an autonomous traveling technology of finding a destination by itself even without a driver directly operating a steering wheel, an accelerator pedal, and a brake, and is rapidly developed recently.

If an autonomous traveling situation is universally realized, it is possible to select a manual driving mode in which the driver directly drives a vehicle and an autonomous traveling mode in which the vehicle travels to the destination by itself without the driver directly driving.

Because the driver may be able to comfortably take the rest by extending his or her feet in the autonomous traveling mode, there is a disadvantage in that if a pedal (accelerator pedal or brake pedal) located in a space under a driver's seat is exposed to the inside as it is, this interferes with the driver's rest.

Furthermore, the autonomous traveling situation is a situation in which the driver does not operate the vehicle pedal (accelerator pedal or brake pedal), and if the driver operates the pedal during the autonomous traveling, a vehicle control unit determines it as a situation in which the driver terminates the autonomous traveling and the driver wants to directly drive the vehicle to terminate a control for autonomous traveling.

However, because the vehicle pedal is provided in the space under the driver's seat to be exposed, there is a concern that the driver can unconsciously operate the pedal in the autonomous traveling situation (in a misoperation situation of the pedal), and in the instant case, there is a concern that an accident can occur in accordance with a road situation, an inter-vehicle distance, or etc.

Therefore, in the manual driving mode in which the driver directly drives the vehicle, the pedal pad is exposed to protrude toward the driver to be operable by the driver, and in the autonomous traveling situation, it is necessary to develop a technology for a pedal apparatus that blocks the exposure of the pedal pad to be inoperable by the driver for comfortable rest and safety such as misoperation of the driver.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a foldable pedal apparatus for a vehicle in which in a manual driving mode in which a driver directly drives a vehicle, a pedal pad protrudes and is exposed (popped up) toward a driver to be operable by the driver, and in an autonomous traveling situation of the vehicle, the pedal pad is hidden and blocked (hidden) from being exposed toward the driver to be inoperable by the driver, facilitating the driver to comfortably take the rest in the autonomous traveling situation, and furthermore, improving safety by blocking the misoperation of the pedal in the autonomous traveling situation.

Furthermore, another object of the foldable pedal apparatus according to an exemplary embodiment of the present disclosure is to maximize an interior design of a vehicle interior through a configuration in which a pedal pad in a hidden state is invisible from the internal side, and to maximize high-tech images through a configuration in which the pedal pad protrudes and is popped up at an invisible place upon pop-up operation.

Furthermore, yet another object of the foldable pedal apparatus according to an exemplary embodiment of the present disclosure is to secure a vehicle interior space and a power electronics (PE) room space as much as possible through a configuration configured for minimizing a hidden space of the pedal apparatus in the hidden state.

Furthermore, yet another object of the foldable pedal apparatus according to an exemplary embodiment of the present disclosure is to increase a popped-up amount by changing a length with a rotation center portion of a pedal pad through a configuration in which only the pedal pad operated by a driver's foot is rotated and popped-up.

A foldable pedal apparatus of a vehicle according to an exemplary embodiment of the present disclosure for achieving the objects includes a base body coupled to a bottom portion of front of a footrest panel; a pedal arm including a first end portion rotatably coupled to the base body via a hinge pin; and a pedal pad including one end portion rotatably coupled to a second end portion of the pedal arm, and operated in response to movement of a driver's foot, in which in an autonomous traveling situation of the vehicle, the pedal pad is rotated to extend in a longitudinal direction of the pedal arm and located in a PE room space and therefore, is in a hidden state of being inoperable by the driver, and in a manual driving mode, the pedal pad is provided to penetrate a footrest panel to be rotated to protrude backward and is exposed toward the driver and therefore, is in a popped-up state of being operable by the driver.

Two pedal assemblies including the base body, the pedal arm, and the pedal pad are formed in a same configuration and provided to be laterally spaced from each other on the footrest panel.

One of the two pedal assemblies provided to be laterally spaced from each other on the footrest panel is used as an accelerator pedal apparatus, and a remaining one is used as a brake pedal apparatus.

The base body is fixed to and provided in the PE room space, the pedal arm is coupled to the base body to be rotated in the PE room space, and the pedal pad is located in the PE room space in the autonomous traveling situation, and is rotated with respect to the pedal arm to penetrate a panel hole of the footrest panel to protrude to an internal space in the manual driving mode.

The foldable pedal apparatus for the vehicle further includes a motor fixed to the pedal arm, provided with a motor shaft penetrating the pedal arm and coupled to the pedal pad, and rotating the pedal pad with respect to the pedal arm using the motor shaft upon operation thereof.

The pedal pad is rotatable forward or backward around the motor shaft to absorb a difference between a rotation trajectory of the pedal arm and a rotation trajectory of the driver's foot around the hinge pin when the driver operates the pedal pad with the driver's foot in a state where the pedal pad is in the popped-up state.

The foldable pedal apparatus configured for the vehicle further includes a return spring including first and second end portions provided to be supported by the base body and the pedal arm to provide a return force to the pedal arm.

The foldable pedal apparatus for the vehicle further includes a permanent magnet coupled to direct the base body from a lower portion of the pedal arm coupled with the hinge pin; and a printed circuit board (PCB) fixed to and provided on the base body to face the permanent magnet, in which the PCB is configured to recognize a change in magnetic flux of the permanent magnet upon rotation of the pedal arm to generate a signal related to a pedal function.

The foldable pedal apparatus for the vehicle further includes a cover member made of an elastic material coupled to the footrest panel to cover a panel hole through which the pedal pad is provided to penetrate on the footrest panel, including an appearance increased by the pressurization of the pedal pad when the pedal pad is rotated to become the popped-up state, and including a shape restored when the pedal pad is rotated to become the hidden state.

The one end portion of the pedal arm is formed with a pedal arm groove in an inward concave shape, and a coupling portion of the pedal pad is inserted into the pedal arm groove and coupled to the motor shaft.

A stepped surface of the coupling portion of the pedal pad is located in front of a front surface of the pedal arm groove when the pedal pad is in the hidden state, and the stepped surface of the coupling portion in the front surface of the pedal arm groove is formed in a curved shape not to interfere with each other when the pedal pad is rotated around the motor shaft.

The front surface of the pedal arm groove and the stepped surface of the coupling portion are matched with each other when the pedal pad is in the hidden state, and a stopper portion protruding from a rear end portion of the coupling portion is supported in contact with an internal upper surface of the pedal arm and therefore, the pedal pad is maintained in the hidden state.

An end portion of the curved stepped surface is supported by first and second sides of the pedal arm groove in contact with an upper surface of the pedal arm when the pedal pad is in the popped-up state and therefore, the pedal pad is maintained in the popped-up state.

The base body is provided with a projection to protrude upward, and when the pedal arm is rotated around the hinge pin and the pedal arm contacts with the projection, a full stroke location of the pedal arm is constrained thereby.

According to the foldable pedal apparatus according to an exemplary embodiment of the present disclosure, it is possible to enable the driver to comfortably take the rest in the autonomous traveling situation, and furthermore, improve safety by blocking the misoperation of the pedal in the autonomous traveling situation through the configuration in which in the manual driving mode in which the driver directly drives the vehicle, the pedal pad protrudes and is exposed (popped up) toward the driver to be operable by the driver, and in the autonomous traveling situation, the pedal pad is hidden and blocked (hidden) from being exposed toward the driver to be inoperable by the driver.

Furthermore, according to the foldable pedal apparatus according to an exemplary embodiment of the present disclosure, it is possible to maximize the interior design of the vehicle interior through the configuration in which the pedal pad in the hidden state is covered by the cover member and invisible from the internal side, and to maximize the high-tech images through the configuration in which the pedal pad protrudes and is popped up at the invisible place upon pop-up operation.

Furthermore, according to an exemplary embodiment of the present disclosure, it is possible to secure the vehicle interior space and the PE room space as much as possible through the configuration configured for minimizing the hidden space of the pedal apparatus in the state where the pedal pad is hidden.

Furthermore, according to an exemplary embodiment of the present disclosure, it is possible to increase the popped-up amount by changing the length with the rotation center portion of the pedal pad, and to improve the driver's operability through the pedal pad with increased popped-up amount through the configuration in which only the pedal pad operated by the driver's foot is rotated and popped-up.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
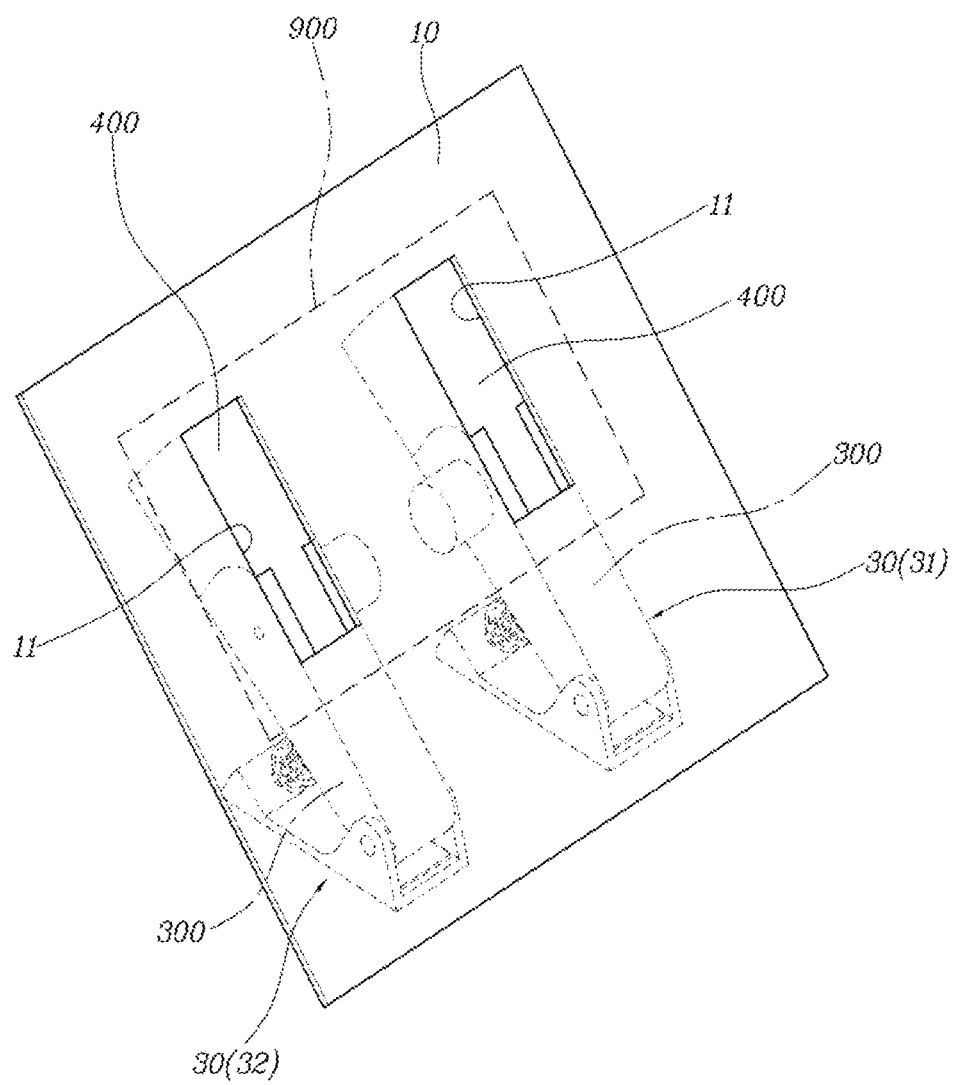
FIG. 1 is a diagram showing a state where a pedal pad is hidden as a foldable pedal apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Specific structural to functional descriptions of the exemplary embodiments of the present disclosure disclosed in the exemplary embodiment or application are only illustrated for describing the exemplary embodiments according to an exemplary embodiment of the present disclosure, and the exemplary embodiments according to an exemplary embodiment of the present disclosure may be embodied in various forms and it should not be construed that the present disclosure is limited to the exemplary embodiments described in the exemplary embodiment or application.

Because the exemplary embodiments according to an exemplary embodiment of the present disclosure may be variously changed and have various forms, specific exemplary embodiments will be illustrated in the drawings and described in detail in the present specification or application. However, this is not intended to limit the exemplary embodiments according to the concept of the present disclosure to a particular disclosed form, and it should be understood that the present disclosure includes all changes, equivalents, and substitutes included in the spirit and scope of the present disclosure.

Terms such as first and/or second may be used to describe various components, but the components should not be limited by the terms. The terms are used only for the purpose of distinguishing one component from another, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring to" should be interpreted in the same manner.

The terminology used in the present specification is merely for the purpose of describing particular exemplary embodiments of the present disclosure, and is not intended to limit the present disclosure. The singular forms may include plural forms unless the contexts clearly indicate the opposite. In the present specification, it may be understood that the term "comprising", "having", or the like specifies the presence of the characteristic, integer, step, operation, component, part, or a combination thereof described, and does not exclude the presence or addition possibility of one or more other characteristics, integers, steps, operations, components, parts, or combinations thereof in advance.

Unless defined otherwise, all terms including technical terms or scientific terms used herein have the same meaning as commonly understood by those skilled in the art to which the present disclosure pertains. The terms defined in the dictionary commonly used may be interpreted as having a meaning consistent with the meaning in the context of the related technology, and may not be interpreted as an ideal or excessively formal meaning, unless clearly defined in the exemplary embodiment of the present disclosure.

A control unit (controller) according to the exemplary embodiment of the present disclosure may be implemented through a non-volatile memory configured to store data relating to an algorithm configured to control the operation of various components of a vehicle or software instructions for reproducing the algorithm and a processor configured to perform operations described below using data stored in the corresponding memory. Here, the memory and the processor may be implemented as separate chips.

Alternatively, the memory and the processor may be implemented as a single chip integrated with each other. The processor can take the form of one or more processors.

Hereinafter, a foldable pedal apparatus for a vehicle according to an exemplary embodiment of the present disclosure will be described with reference to the accompanying drawings.

As shown in FIG. 1, FIG. 2, FIG. 3, FIG. 4, FIG. 5, FIG. 6, FIG. 7, FIG. 8 and FIG. 9, a foldable pedal apparatus for a vehicle according to an exemplary embodiment of the present disclosure includes a base body 100 fixed to and provided on the bottom portion of the front of a footrest panel 10; a pedal arm 300 including one end portion rotatably coupled to the base body 100 via a hinge pin 200; and a pedal pad 400 including one end portion rotatably coupled to the other end portion of the pedal arm 300, and operated by a driver's foot 20.

In an autonomous traveling situation of the vehicle, the pedal pad 400 is rotated to extend in a longitudinal direction of the pedal arm 300 and located in a PE room space and therefore, is operated to become a hidden state of being inoperable by the driver, and in a manual driving mode, the pedal pad 400 is provided to penetrate the footrest panel 10 to be rotated to protrude backward and is exposed toward the driver and therefore, is operated to become a popped-up state of being operable by the driver.

In a motor-driven vehicle, with respect to the footrest panel 10, the front of the footrest panel 10 becomes the PE room space in which power electronics (PE) parts are located, and the rear of the footrest panel 10 becomes an internal space in which the driver is located.

Figure 2:
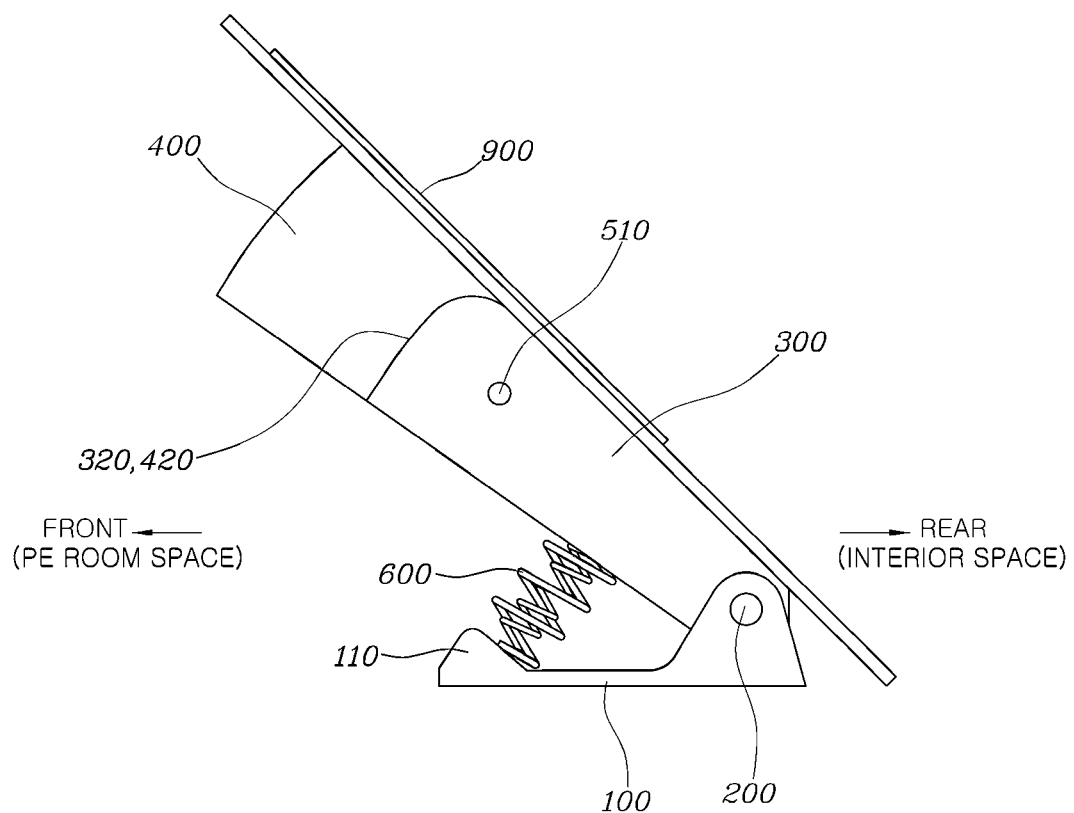
FIG. 2 is a side diagram of FIG. 1.
Figure 3:
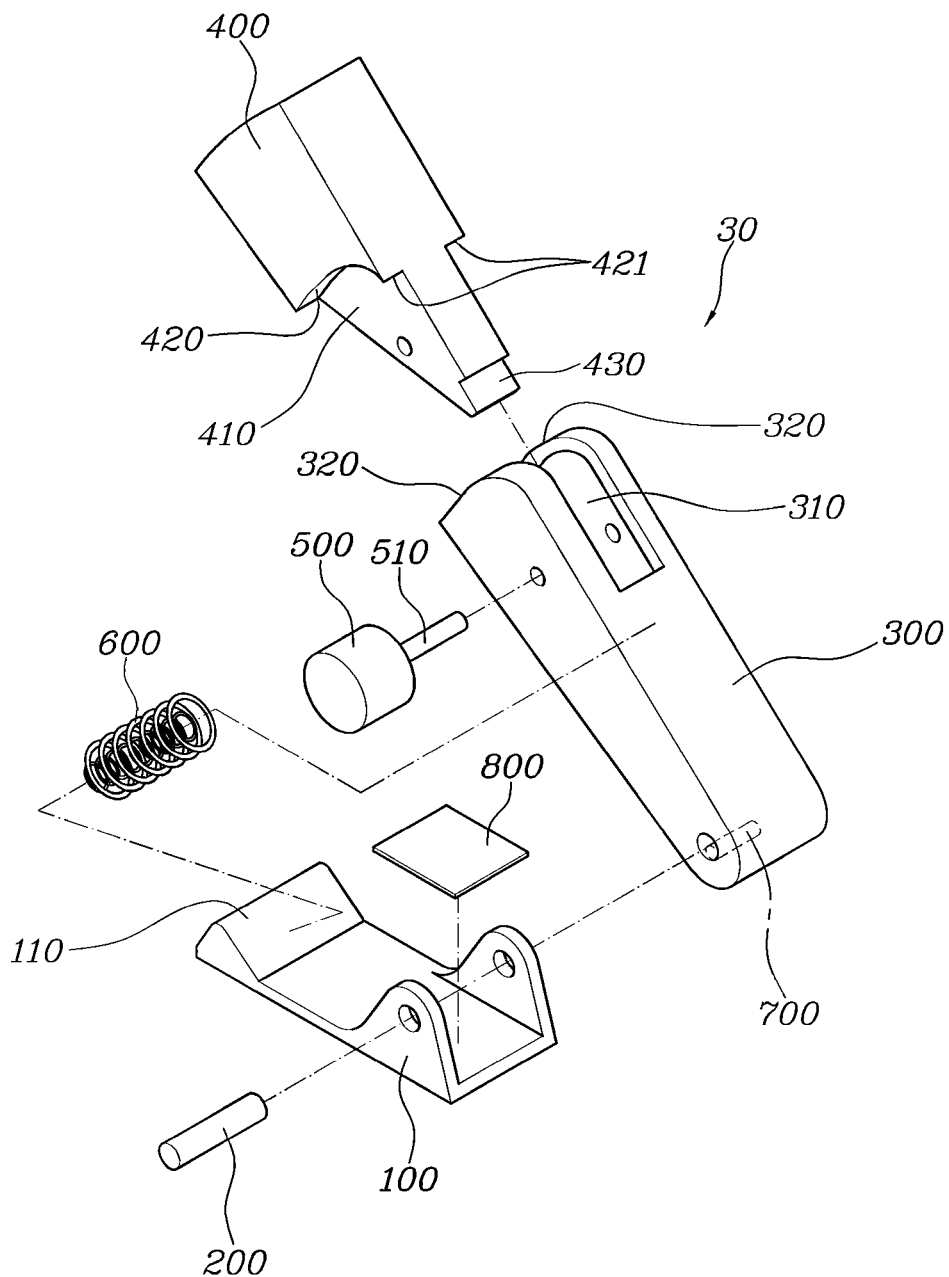
FIG. 3 is an exploded diagram of a pedal assembly according to an exemplary embodiment of the present disclosure.

According to the foldable pedal apparatus according to an exemplary embodiment of the present disclosure, when the pedal pad 400 is rotated with respect to the pedal arm 300 by operation of a motor to be described later to extend in the longitudinal direction of the pedal arm 300, the pedal pad 400 is located in the PE room space, and therefore, the pedal pad 400 is maintained in the hidden state of being inoperable by the driver (see FIG. 1 and FIG. 2).

When the pedal pad 400 is in the hidden state, the entire pedal assembly including the pedal pad 400 may be located in the PE room space and not exposed to the driver or passenger's sight, maximizing an interior design of a vehicle interior.

Furthermore, according to an exemplary embodiment of the present disclosure, it is possible to secure the vehicle interior space and the PE room space as much as possible through a configuration capable of minimizing the hidden space of the hidden pedal pad 400.

Figure 6:
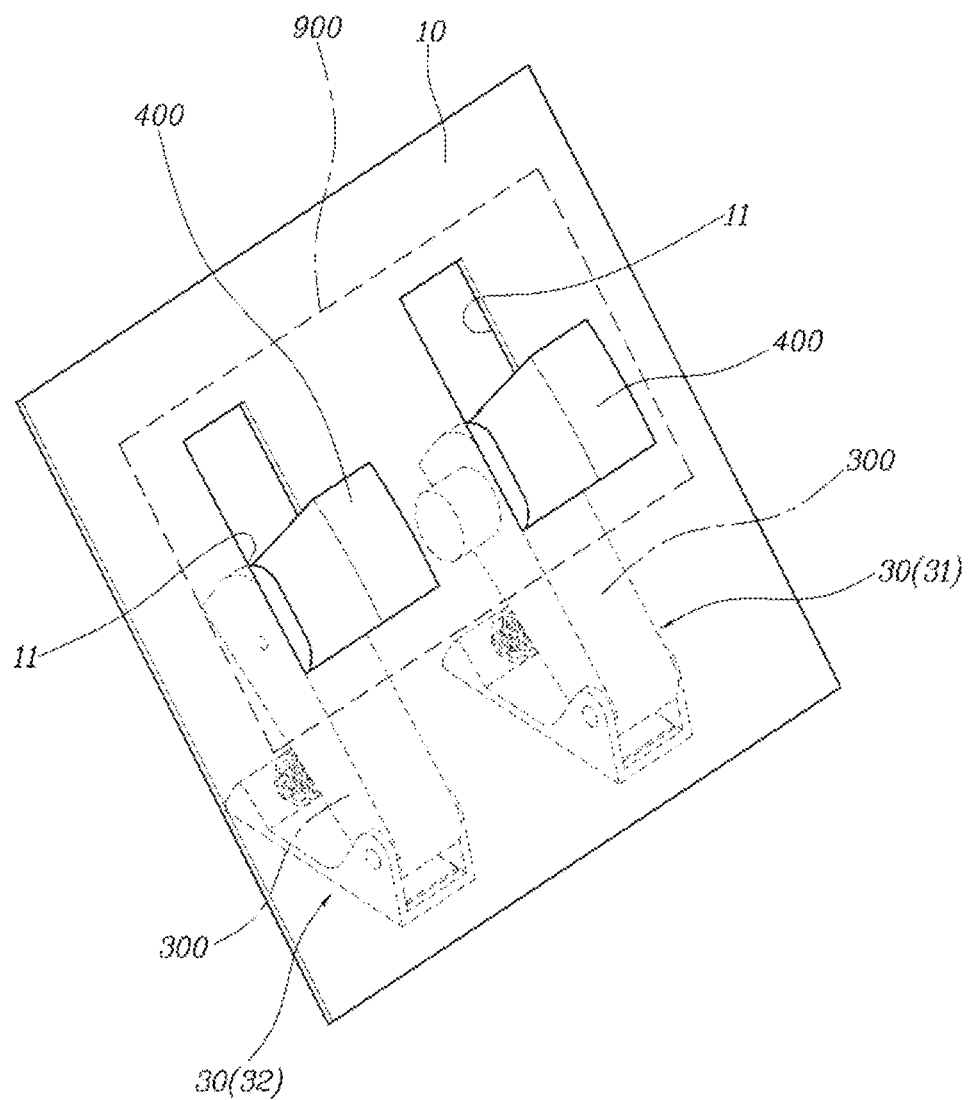
FIG. 6 is a diagram showing a state where the pedal pad is popped up in FIG. 1.

Furthermore, according to the foldable pedal apparatus according to an exemplary embodiment of the present disclosure, when the pedal pad 400 is in a state of being rotated with respect to the pedal arm 300 by operation of the motor to be described later to protrude to the vehicle interior space in which the driver is located, the pedal pad 400 is exposed toward the driver and therefore, is in the popped-up state of being operable by the driver (see FIG. 6 and FIG. 7).

The pedal pad 400 has a configuration exposed to the internal space in which the driver is located while protruding through a panel hole 11 of the footrest panel 10 when the pedal pad 400 in the hidden state is rotated with respect to the pedal arm 300 to be changed into the popped-up state.

Therefore, it is possible to maximize high-tech images through a configuration in which the pedal pad 400 is hidden in the PE room space with respect to the footrest panel 10 upon the popped-up operation and protrudes and is popped-up through the panel hole 11 of the footrest panel 10.

A pedal assembly 30 of the foldable pedal apparatus according to an exemplary embodiment of the present disclosure includes the base body 100, the pedal arm 300, and the pedal pad 400, and two pedal assemblies 30 are formed entirely in the same configuration, and the two pedal assemblies 30 are provided to be horizontally spaced from each other on the footrest panel 10, in which any one of the two pedal assemblies 30 provided to be horizontally spaced from each other on the footrest panel 10 is used as a pedal assembly 31 of an accelerator pedal apparatus, and the other one is used as a pedal assembly 32 of a brake pedal apparatus.

The pedal assembly 30 according to an exemplary embodiment of the present disclosure includes a return spring, a rotation motor, a permanent magnet, a PBC, etc. In addition to the base body 100, the pedal arm 300, and the pedal pad 400.

The pedal assembly 30 has a structure in which the base body 100 is fixed to and provided in the PE room space; the pedal arm 300 is coupled to the base body 100 to be rotated in the PE room space; and the pedal pad 400 is located in the PE room space in the autonomous traveling situation, and is rotated with respect to the pedal arm 300 to penetrate the panel hole 11 of the footrest panel 10 to protrude to the internal space in the manual driving mode.

The present disclosure further includes an actuator, that is, a motor 500 configured to rotate the pedal pad 400.

The motor 500 is fixed to one side of the pedal arm 300, provided with a motor shaft 510 penetrating the pedal arm 300 and coupled to the pedal pad 400, and is configured to rotate the pedal pad 400 with respect to the pedal arm 300 using the motor shaft 510 rotated upon operation thereof.

An operation of the motor 500 may be controlled by a printed circuit board (PCB) to be described later.

Figure 8:
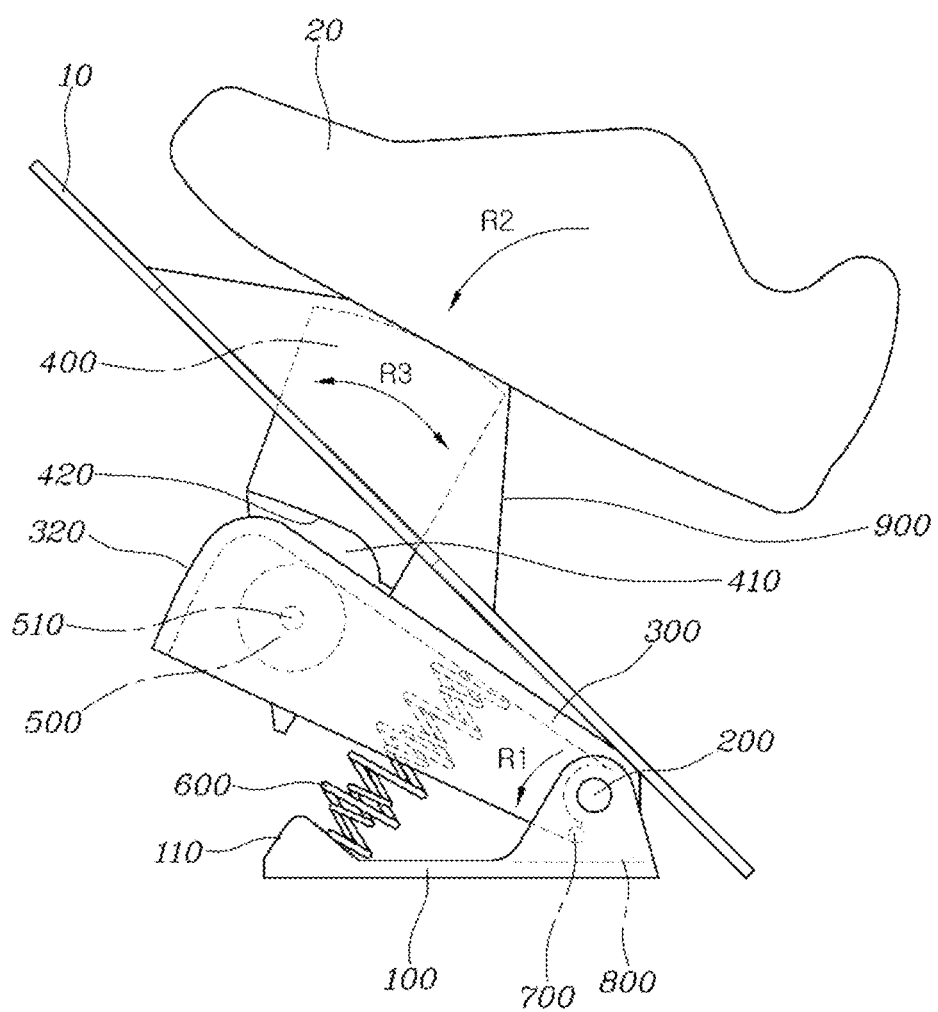
FIG. 8 is a diagram showing a normal operation state where the pedal arm is rotated by a driver operating the popped-up pedal pad with his or her foot.

As shown in FIG. 8, the popped-up pedal pad 400 may be depressed and operated by the driver's foot 20, and when the driver depresses the pedal pad 400 and applies a force, the pedal arm 300 is rotated with respect to the base body 100 around the hinge pin 200.

When the pedal arm 300 is rotated by the driver's operation, there is a difference between a rotation trajectory (arrow R1) of the pedal arm 300 and a rotation trajectory (arrow R2) of the driver's foot 20 around the hinge pin 200, and at the instant time, the pedal pad 400 is rotated (arrow R3) forward or backward around the motor shaft 510 to absorb the difference between the rotation trajectory of the pedal arm 300 and the rotation trajectory of the driver's foot 20.

In other words, the motor 500 does not have a structure of being fixed after operation to move up the pedal pad 400, and is in a state of continuously applying a rotation force to the pedal pad 400, and therefore, when the driver operates the pedal pad 400 with his or her foot, the motor shaft 510 becomes a hinge shaft and the pedal pad 400 is rotated. Therefore, the pedal pad 400 can become a rotation pad, improving operability.

The present disclosure further includes a return spring 600 provided to have both end portions supported by the base body 100 and the pedal arm 300 to provide a return force to the pedal arm 300.

The return spring 600 can have a configuration that a lower end portion of the return spring 600 is supported by the base body 100, and an upper end portion of the return spring 600 is inserted into the internal space of the pedal arm 300 and supported by the pedal arm 300, securing an efficient layout structure. As a result, it is possible to reduce the sizes of the base body 100 and the pedal arm 300 and the entire appearance size of the pedal apparatus.

A pedal effort of the return spring 600 may be tuned by tuning a spring force, and the return spring 600 may be formed of a dual spring with different spring forces to suppress the slight tremors of the pedal arm 300, and a compressor coil spring may be used.

The foldable pedal apparatus according to an exemplary embodiment of the present disclosure further includes a permanent magnet 700 coupled to direct the base body 100 from a lower portion of the pedal arm 300 coupled with the hinge pin 200, and a printed circuit board (PCB) 800 fixed to and provided on the base body 100 to face the permanent magnet 700, in which the PCB 800 recognizes a change in magnetic flux of the permanent magnet 700 upon rotation of the pedal arm 300 to generate a signal related to the pedal function, and the signal related to the pedal function is a signal related to braking or a signal related to acceleration.

The PCB 800 can have a function of controlling the operation of the motor together, and to the present end, the PCB 800 and the motor 500 have a configuration electrically connected to each other to transmit or receive the signal, and the motor 500 has a configuration electrically connected to a power supply for operation.

When the pedal pad 400 is rotated with respect to the pedal arm 300 by the operation of the motor 500 to protrude to the vehicle interior space in which the driver is located, as shown in FIG. 8, the pedal pad 400 is in the popped-up state, and the popped-up pedal pad 400 is depressed and operated by the driver's foot 20, and the pedal arm 300 is rotated with respect to the base body 100 around the hinge pin 200 when the driver depresses the pedal pad 400 to apply a force, a location of the permanent magnet 700 is changed upon rotation of the pedal arm 300, and the PCB 800 recognizes the change in magnetic flux according to a change in location of the permanent magnet 700 to generate the signal related to the pedal function.

The exemplary embodiment of the present disclosure further includes a cover member 900 made of an elastic material coupled to the footrest panel 10 to cover the panel hole 11 through which the pedal pad 400 is provided to penetrate on the footrest panel 10.

The cover member 900 made of the elastic material is coupled to cover the panel hole 11 on a rear surface of the footrest panel 10, and therefore, the pedal pad 400 may be covered by the cover member 900 so that the pedal pad 400 is invisible from the inside, improving the aesthetic appearance, and furthermore, preventing foreign substances from being introduced through the panel hole 11.

The cover member 900 made of the elastic material is a cover made of a fiber material with elasticity such as Nylon, and is characterized in that the appearance thereof is increased by the pressurization of the pedal pad 400 when the pedal pad 400 is rotated to become the popped-up state, and the shape thereof is restored when the pedal pad 400 is rotated to become the hidden state.

The present disclosure has a structure in which the end portion of the pedal arm 300 is formed with a pedal arm groove 310 in an inward concave shape, and a coupling portion 410 of the pedal pad 400 is inserted into the pedal arm groove 310 and coupled to the motor shaft 510.

A front end portion of the pedal arm 300 is formed with the pedal arm groove 310, and the pedal arm groove 310 is formed to be opened forward, and upwardly and downwardly from the pedal arm 300.

The rear of the pedal pad 400 becomes the coupling portion 410 inserted into the pedal arm groove 310, and the coupling portion 410 has both side surfaces concavely formed and is formed in the thickness smaller than that of the front of the pedal pad 400.

The coupling portion 410 of the pedal pad 400 is inserted into the pedal arm groove 310 of the pedal arm 300, the motor 500 is fixed to one side surface of the pedal arm 300, and the motor shaft 510 is integrally coupled to the coupling portion 410 of the pedal pad 400 while penetrating the pedal arm groove 310 laterally. Therefore, when the motor shaft 510 is rotated by the driving of the motor 500, the coupling portion 410 of the pedal pad 400 is rotated in the pedal arm groove 310, and therefore, the pedal pad 400 is operated to become the hidden state and the popped-up state.

When the pedal pad 400 is in the hidden state, a stepped surface 420 of the coupling portion 410 of the pedal pad 400 is located in front of the front surface 320 of the pedal arm groove 310, and the front surface 320 of the pedal arm groove 310 and the stepped surface 420 of the coupling portion 410 have a structure which is formed in a curved shape not to interfere with each other when the pedal pad 400 is rotated around the motor shaft 510.

Figure 4:
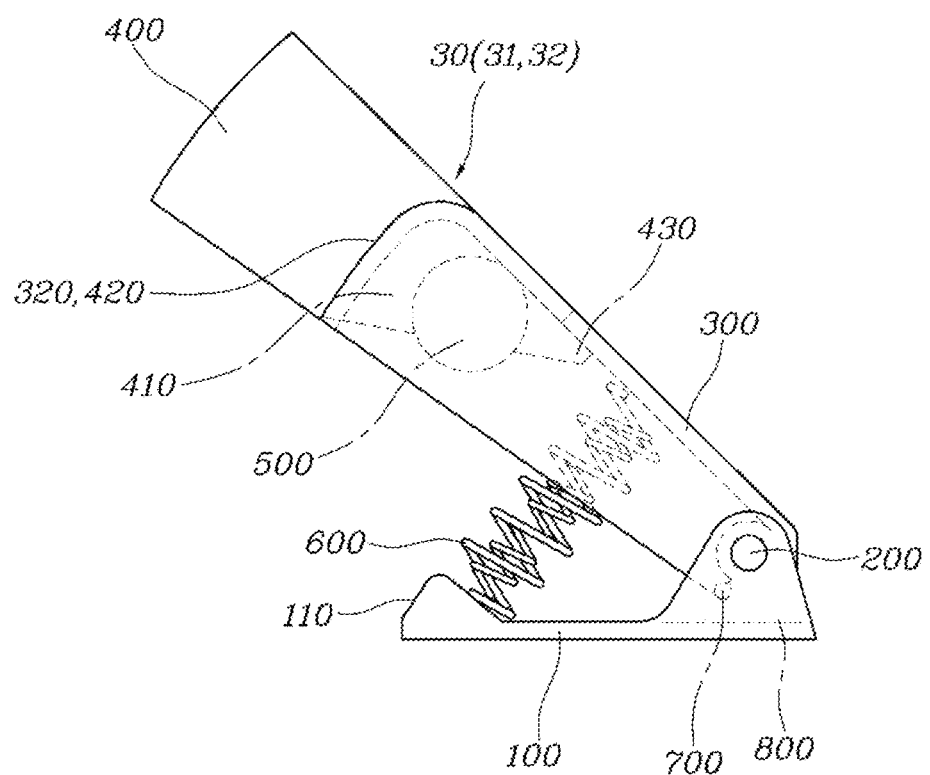
FIG. 4 is a side diagram of the coupled state of FIG. 3.
Figure 5:
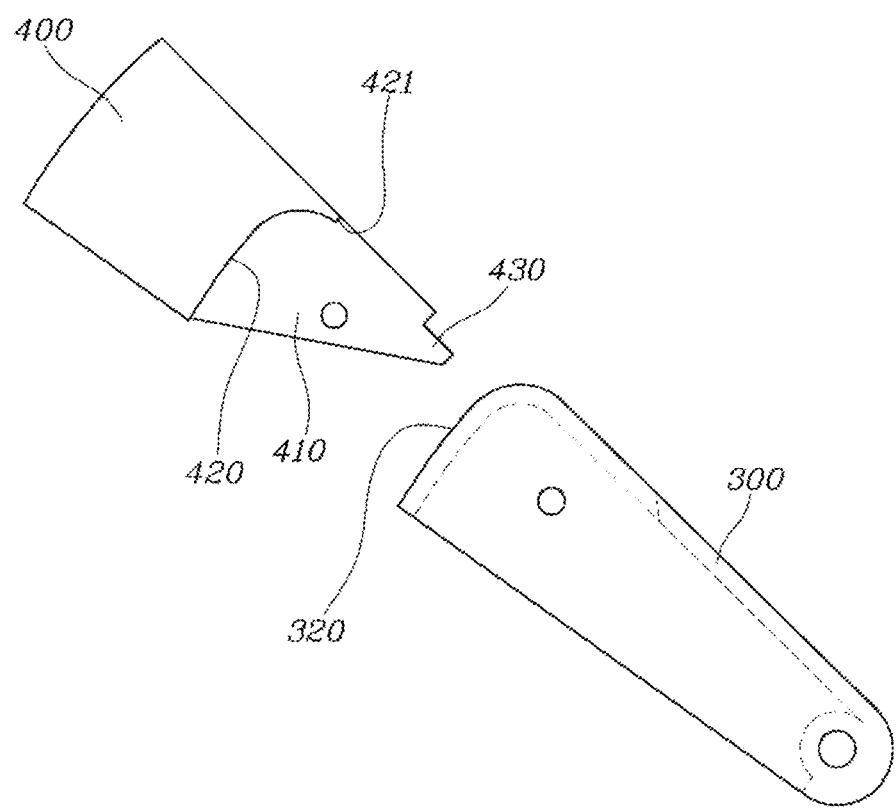
FIG. 5 is a diagram for explaining a pedal arm and a pedal pad according to an exemplary embodiment of the present disclosure.

Meanwhile, when the pedal pad 400 is in the hidden state, the front surface 320 of the pedal arm groove 310 and the stepped surface 420 of the coupling portion 410 are matched with each other, and as a stopper portion 430 protruding from the rear end portion of the coupling portion 410 is supported in contact with an internal upper surface of the pedal arm 300, the pedal pad 400 is maintained in the hidden state (see FIG. 4).

Figure 7:
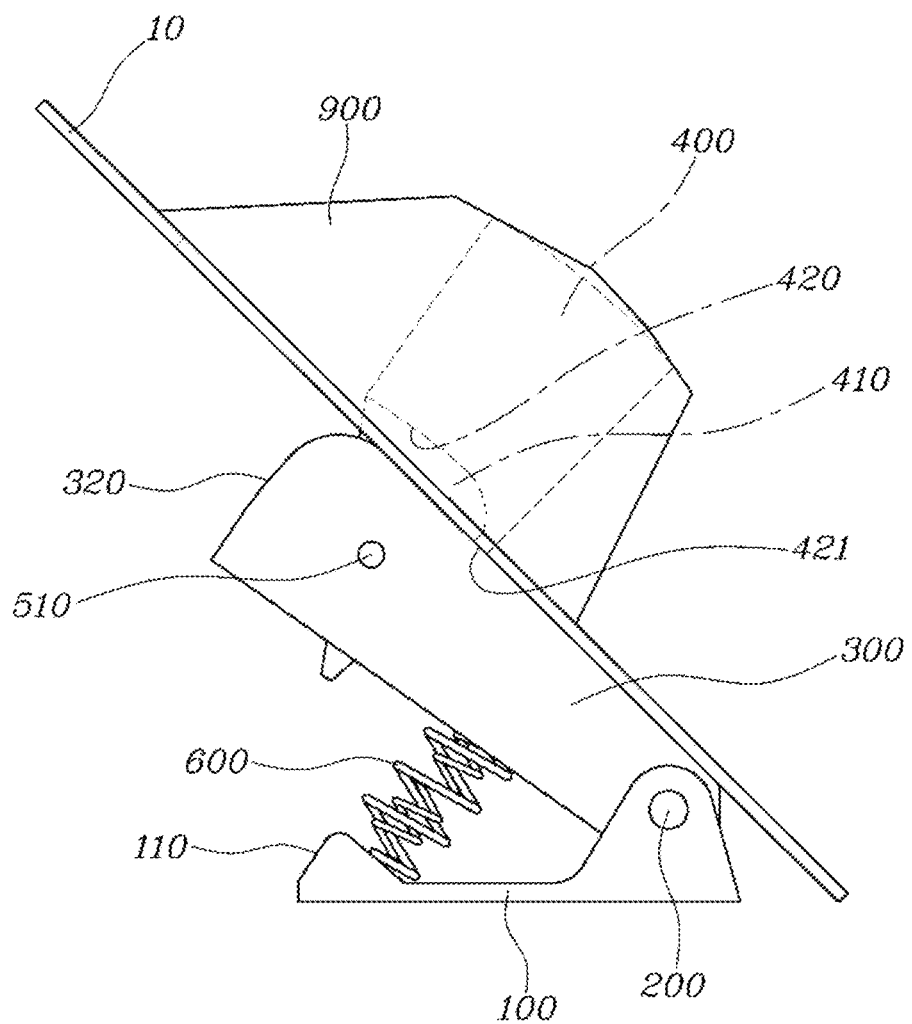
FIG. 7 is a side diagram of FIG. 6.

Furthermore, when the pedal pad 400 is in the popped-up state, as an end portion 421 of the curved stepped surface 420 is supported in contact with the upper surface of the pedal arm 300 on both sides of the pedal arm groove 310, the pedal pad 400 is maintained in the popped-up state (see FIG. 7).

Figure 9:
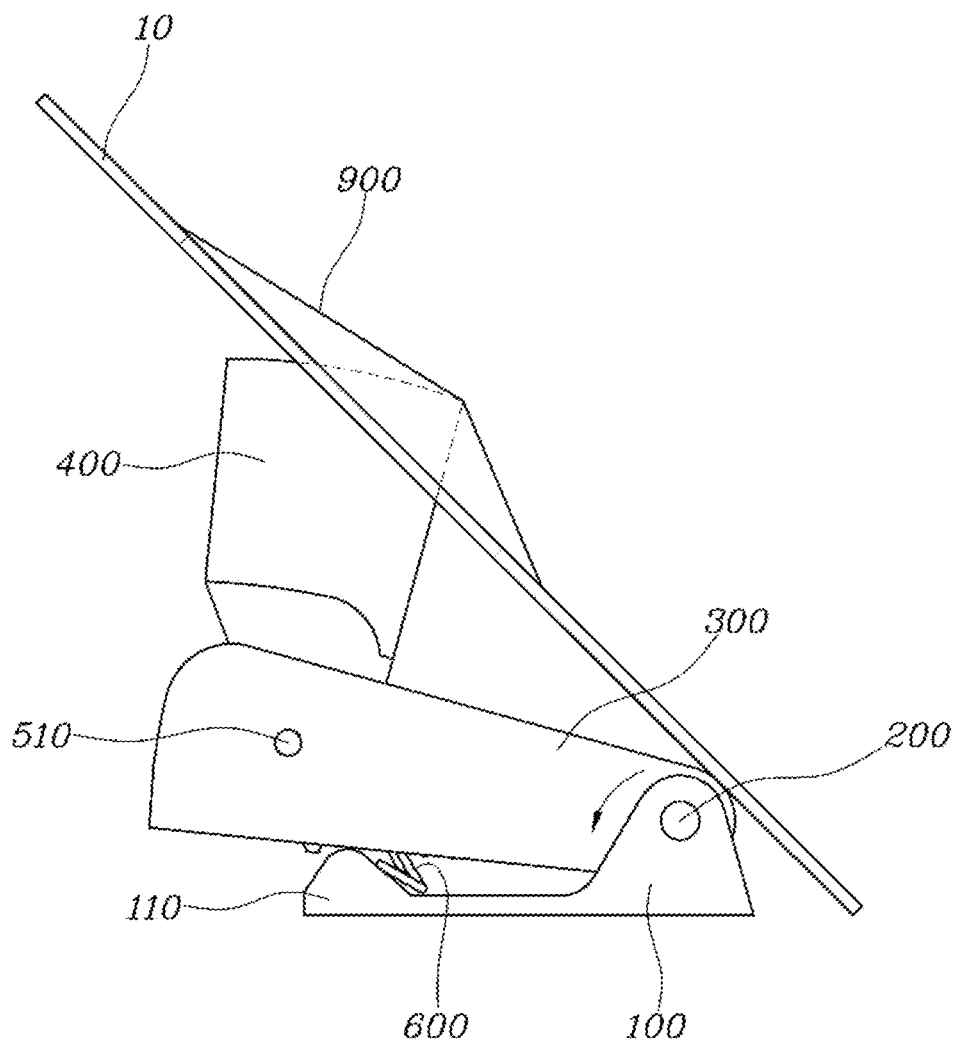
FIG. 9 is a diagram showing a full stroke of the pedal arm.

The exemplary embodiment of the present disclosure has a structure in which a projection 110 is provided on the front end portion of the base body 100 to protrude upward, and when the pedal arm 300 is rotated around the hinge pin 200 and the pedal arm 300 contacts with the projection 110, a full stroke location of the pedal arm 300 is constrained (see FIG. 9).

As described above, according to the foldable pedal apparatus according to an exemplary embodiment of the present disclosure, it is possible to enable the driver to comfortably take the rest, and furthermore, to improve safety by blocking the misoperation of the pedal in the autonomous traveling situation through the configuration in which in the manual driving mode in which the driver directly drives the vehicle, the pedal pad 400 protrudes and is exposed (popped-up) toward the driver to be operable by the driver, and in the autonomous traveling situation, the pedal pad 400 is hidden and blocked (hidden) from being exposed toward the driver to be inoperable by the driver.

Furthermore, according to the foldable pedal apparatus according to an exemplary embodiment of the present disclosure, it is possible to maximize the interior design of the vehicle interior through the configuration in which the pedal pad 400 in the hidden state is covered by the cover member 900 to be invisible from the inside, and to maximize the high-tech images through the configuration in which the pedal pad 400 protrudes and is popped up at the invisible place upon the pop-up operation.

Furthermore, according to an exemplary embodiment of the present disclosure, it is possible to secure the vehicle interior space and the PE room space as much as possible through the configuration configured for minimizing the hidden space of the pedal apparatus in the hidden state of the pedal pad 400.

Furthermore, according to an exemplary embodiment of the present disclosure, it is possible to increase the popped-up amount by changing the length with the rotation center portion of the pedal pad 400, and to improve the driver's operability through the pedal pad 400 with increased popped-up amount through the configuration in which only the pedal pad 400 operated by the driver's foot is rotated and popped-up.

In an exemplary embodiment of the present invention, a controller is connected to the motor 500, to control the operations thereof.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A foldable pedal apparatus for a vehicle, the foldable pedal apparatus comprising:
   a base body coupled to a bottom portion of a front of a footrest panel;
   a pedal arm including a first end portion rotatably coupled to the base body via a hinge pin; and
   a pedal pad including one end portion rotatably coupled to a second end portion of the pedal arm, and operated in response to movement of a driver's foot,
   wherein in an autonomous traveling situation of the vehicle,
   the pedal pad is rotated such that a longitudinal axis of the pedal pad extends parallel to a longitudinal axis of the pedal arm and the pedal pad is located in a power electronics (PE) room space and therefore, is in a hidden state of being inoperable by the driver, and
   wherein in a manual driving mode, the pedal pad is provided to penetrate a footrest panel to be rotated to protrude backward and is exposed toward the driver and therefore, is in a popped-up state of being operable by the driver.

2. The foldable pedal apparatus of claim 1,
   wherein two pedal assemblies including the base body, the pedal arm, and the pedal pad are formed in a same configuration and provided to be laterally spaced from each other on the footrest panel.

3. The foldable pedal apparatus of claim 2,
   wherein one of the two pedal assemblies provided to be laterally spaced from each other on the footrest panel is used as an accelerator pedal apparatus, and a remaining one is used as a brake pedal apparatus.

4. The foldable pedal apparatus of claim 1,
   wherein the base body is fixed to and provided in the PE room space,
   wherein the pedal arm is coupled to the base body to be rotated in the PE room space, and
   wherein the pedal pad is located in the PE room space in the autonomous traveling situation, and is rotated with respect to the pedal arm to penetrate a panel hole of the footrest panel to protrude into an internal space in the manual driving mode.

5. The foldable pedal apparatus of claim 1, further including: an actuator fixed to the pedal arm and coupled to the pedal pad and configured for rotating the pedal pad with respect to the pedal arm.

6. The foldable pedal apparatus of claim 5, wherein the actuator is a motor fixed to the pedal arm, provided with a motor shaft penetrating the pedal arm and coupled to the pedal pad, and rotating the pedal pad with respect to the pedal arm using the motor shaft upon operation thereof.

7. The foldable pedal apparatus of claim 6,
   wherein the pedal pad is rotatable forward or backward around the motor shaft to absorb a difference between a rotation trajectory of the pedal arm and a rotation trajectory of the driver's foot around the hinge pin when the driver operates the pedal pad with the driver's foot in a state where the pedal pad is in the popped-up state.

8. The foldable pedal apparatus of claim 6,
   wherein the second end portion of the pedal arm is formed with a pedal arm groove, and
   wherein a coupling portion of the pedal pad is inserted into the pedal arm groove and coupled to the motor shaft.

9. The foldable pedal apparatus of claim 8,
   wherein the coupling portion of the pedal pad includes a stepped surface,
   wherein the stepped surface of the coupling portion of the pedal pad is located in front of a front surface of the second end portion of the pedal arm when the pedal pad is in the hidden state, and
   wherein each of the stepped surface of the coupling portion and the front surface of the second end portion of the pedal arm is formed in a curved shape so that the stepped surface and the front surface do not to interfere with each other when the pedal pad is rotated.

10. The foldable pedal apparatus of claim 9, wherein the front surface of the second end portion of the pedal arm and the stepped surface of the coupling portion are matched with each other when the pedal pad is in the hidden state.

11. The foldable pedal apparatus of claim 10, further including a stopper portion protruding from a rear end portion of the coupling portion, wherein the stopper portion is supported in contact with an internal upper surface of the pedal arm and therefore, the pedal pad is maintained in the hidden state.

12. The foldable pedal apparatus of claim 9, wherein an end portion of the curved stepped surface is supported by first and second sides of the second end portion of the pedal arm in contact with an upper surface of the pedal arm when the pedal pad is in the popped-up state and therefore, the pedal pad is maintained in the popped-up state.

13. The foldable pedal apparatus of claim 1, further including:
a return spring including first and second end portions provided to be supported by the base body and the pedal arm to provide a return force to the pedal arm.

14. The foldable pedal apparatus of claim 13, wherein the return spring is formed of dual springs with different spring forces.

15. The foldable pedal apparatus of claim 1, further including:
a permanent magnet coupled to a lower portion of the pedal arm; and
a printed circuit board (PCB) fixed to and provided on the base body to face the permanent magnet,
wherein the PCB is configured to recognize a change in magnetic flux of the permanent magnet upon rotation of the pedal arm to generate a signal related to a pedal function.

16. The foldable pedal apparatus of claim 1, further including:
a cover member made of an elastic material coupled to the footrest panel to cover a panel hole through which the pedal pad is provided to penetrate the footrest panel, including an appearance increased by pressurization of the pedal pad when the pedal pad is rotated to become the popped-up state, and including a shape restored when the pedal pad is rotated to become the hidden state.

17. The foldable pedal apparatus of claim 1, wherein the base body is provided with a projection to protrude upward, and
wherein when the pedal arm is rotated around the hinge pin and the pedal arm contacts with the projection, a full stroke location of the pedal arm is constrained thereby.

* * * * *